(12) United States Patent
Wolf

(10) Patent No.: US 7,956,508 B2
(45) Date of Patent: Jun. 7, 2011

(54) GENERATOR, IN PARTICULAR FOR MOTOR VEHICLES

(75) Inventor: Gert Wolf, Affalterbach (DE)

(73) Assignee: Robert Bosch GmbH, Stuttgart (DE)

( * ) Notice: Subject to any disclaimer, the term of this patent is extended or adjusted under 35 U.S.C. 154(b) by 237 days.

(21) Appl. No.: 12/159,234

(22) PCT Filed: Jan. 2, 2007

(86) PCT No.: PCT/EP2007/050015
§ 371 (c)(1),
(2), (4) Date: Sep. 8, 2008

(87) PCT Pub. No.: WO2007/077237
PCT Pub. Date: Jul. 12, 2007

(65) Prior Publication Data
US 2009/0121575 A1    May 14, 2009

(30) Foreign Application Priority Data

Dec. 30, 2005   (DE) .................. 10 2005 063 271

(51) Int. Cl.
H02K 23/26    (2006.01)
(52) U.S. Cl. ........................................ 310/203; 310/179
(58) Field of Classification Search .................. 310/203, 310/263, 62, 179–181, 184; 322/67; 290/38 R, 290/40 C
See application file for complete search history.

(56) References Cited

U.S. PATENT DOCUMENTS

| 4,307,311 | A | * | 12/1981 | Grozinger | 310/179 |
| 4,751,448 | A | * | 6/1988 | Auinger | 318/773 |
| 5,336,956 | A | * | 8/1994 | Haner | 310/179 |
| 5,994,802 | A | * | 11/1999 | Shichijyo et al. | 310/51 |
| 6,093,992 | A | * | 7/2000 | Akemakou | 310/181 |
| 6,414,410 | B1 | * | 7/2002 | Nakamura et al. | 310/179 |
| 6,894,411 | B2 | * | 5/2005 | Schmid et al. | 310/71 |
| 2002/0125784 | A1 | * | 9/2002 | Bramson et al. | 310/184 |
| 2002/0130578 | A1 | * | 9/2002 | Anma et al. | 310/179 |
| 2003/0071534 | A1 | * | 4/2003 | Kreuzer et al. | 310/216 |
| 2004/0007931 | A1 | * | 1/2004 | Gorohata et al. | 310/180 |
| 2004/0150228 | A1 | * | 8/2004 | Kropp et al. | 290/1 C |
| 2005/0116570 | A1 | * | 6/2005 | Edelson | 310/179 |

FOREIGN PATENT DOCUMENTS

DE   44 22 622   1/1996
DE   102 09 054   9/2002

* cited by examiner

*Primary Examiner* — Quyen Leung
*Assistant Examiner* — Naishadh N Desai
(74) *Attorney, Agent, or Firm* — Michael J. Striker

(57) ABSTRACT

The invention relates to a generator, especially for motor vehicles, which comprises a generator stator (36) having winding slots and subcoils (10 21) lying in said winding slots (35). The subcoils (10 21) are connected to each other via a bridge circuit (3) in order to produce a DC voltage from a multiphase AC voltage produced by a rotary field. The generator is configured as a multiphase generator (30), preferably a three-phase or six-phase generator (30). The aim of the invention is to reduce magnetic nose and torque ripple merely by modifying the subcoil wiring. For this purpose, the subcoils (10 21) are connected to an angular ring and the bridge circuit (3) connected to the ring has a lower phase number than corners of the angular ring circuit (1).

12 Claims, 6 Drawing Sheets

GENERATOR, IN PARTICULAR FOR MOTOR VEHICLES

Figure 1:
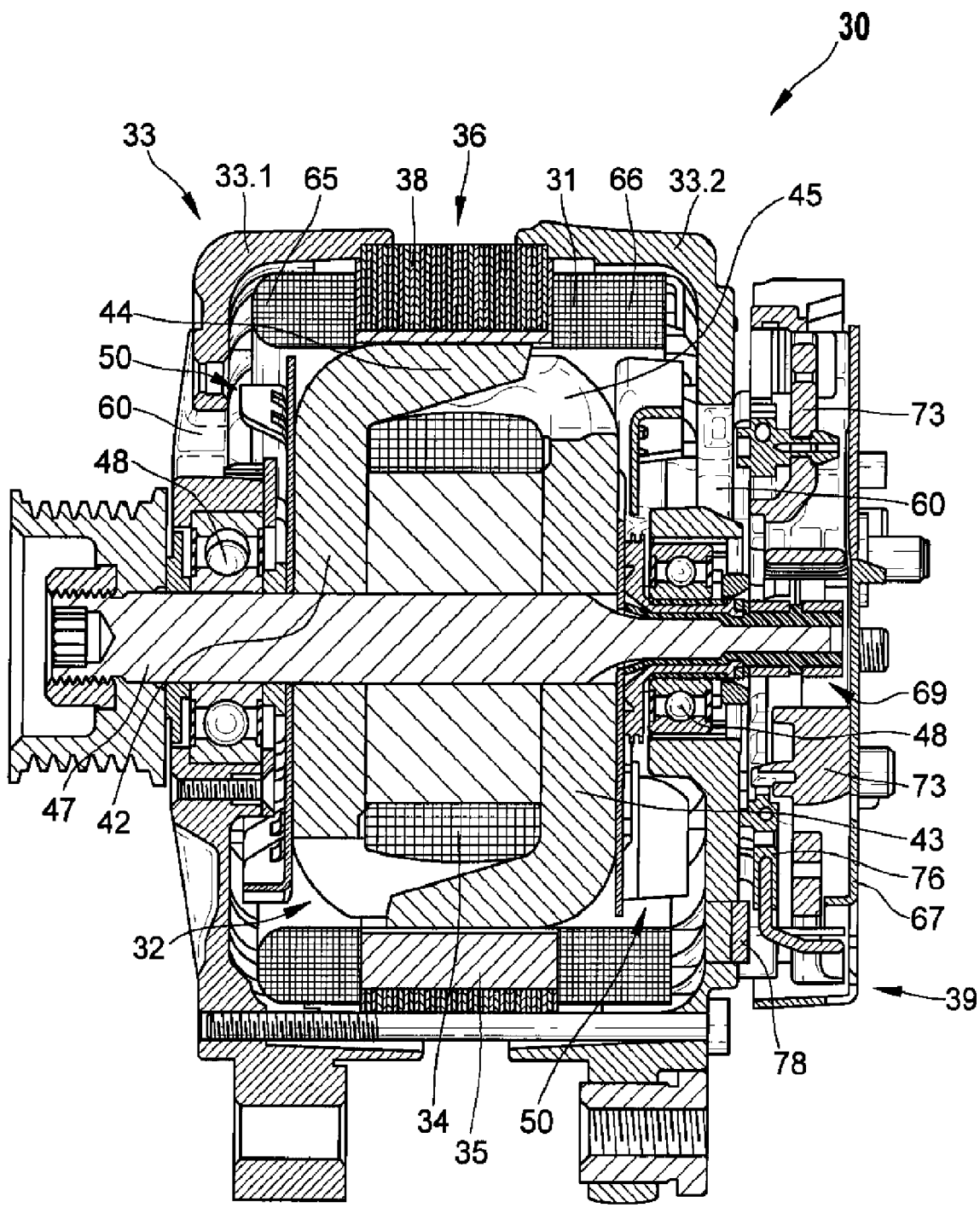

The invention relates to a generator, in particular for motor vehicles, with the defining characteristics mentioned in the preamble to claim 1.

PRIOR ART

In motor vehicles, generators of this kind are used for supplying electrical energy, for example in order to supply an electrical system and/or to charge a vehicle battery.

The generators are embodied as 3-phase or 6-phase generators in which a bridge circuit with semiconductor components and rectifier diodes converts a rotating field-produced AC voltage and phase-shifted voltages into a DC voltage.

The higher the phase number of the generator, the lower the so-called magnet noise and also the lower the torque ripple. The price paid for this advantage, though, is a larger number of semiconductor components, thus also incurring higher costs for the bridge circuit.

A 6-phase generator requires twelve semiconductor elements and twelve power semiconductors.

ADVANTAGES OF THE INVENTION

The generator according to the invention improves the magnet noise and torque ripple levels merely by changing the connections of the partial phase windings. Fewer semiconductors and rectifier diodes are used, resulting in a significant reduction in cost.

The invention is based on the knowledge that a ring connection according to the invention not only improves the torque ripple level, etc., but also does not change the characteristic curve of the generator. This simplifies generator planning and design. In the ring connection, the phase windings are connected to form a ring. A triangular circuit is not a ring connection in the sense of the invention.

According to the invention, the phase windings are connected to form a polygon ring, in particular a 12-vertex ring. The torque ripple corresponds approximately to that of a 12-phase circuit. The bridge circuit is particularly intended for a winding arrangement with 3 phases or 6 phases and therefore a smaller number of phases (3 or 6 phases) than vertices 12 vertices) of the ring connection. For example, it is possible to achieve a savings of 12 diodes in the bridge rectifier in a 6-phase winding arrangement or even a savings of 18 diodes in the bridge rectifier in a 3-phase winding arrangement. This achieves not only a savings of the diodes themselves, but also a reduction in the corresponding connection complexity.

In principle, the invention makes use of partial phase windings. These partial phase windings are embodied in the form of half phase windings, i.e. for each half phase winding, there is a second half phase winding with the same electrical phase position, which is accommodated in the same slots of the stator. The partial phase windings are used, for example, to produce a 12-vertex ring connection. The concept, to be precise, is to increase the phase number of the generator to six, for example, and to embody these phases of partial phase windings and thus to implement, for example, an equilateral 12-vertex ring connection.

In an advantageous modification of the partial phase winding connection according to the invention, output wires of the partial phase windings are connected directly to a stator winding head. A winding head connection is inexpensive to implement and can also be produced in an automated fashion.

The generator is particularly suitable for motor vehicles; the nominal voltage of the generator corresponds approximately to the electrical system voltage of a motor vehicle, in particular approximately 14 volts. The characteristic curve of the generator is adapted in a corresponding fashion.

It is particularly advantageous if the individual partial phase windings are composed of continuous wire. This embodiment is significantly less expensive than an embodiment with segmented conductors.

In order to optimize the structural volume of the generator, it is useful for the stator slot space factor to be >50%. The term "stator slot space factor" is understood here to be the electrically conductive cross sectional area of the conductors of a slot in relation to the total area of the slot. The high slot space factor increases the efficiency of the generator. The magnet noise is improved because the rigidity of the winding increases along with the slot space factor.

DRAWINGS

The invention will be explained in greater detail below in two exemplary embodiments, in conjunction with the associated drawings.

Figure 2:
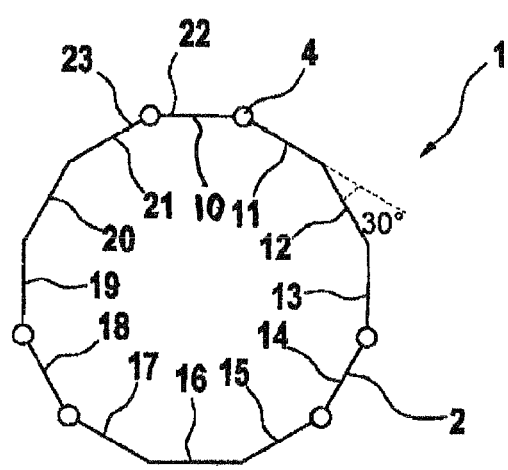
Figure 3:
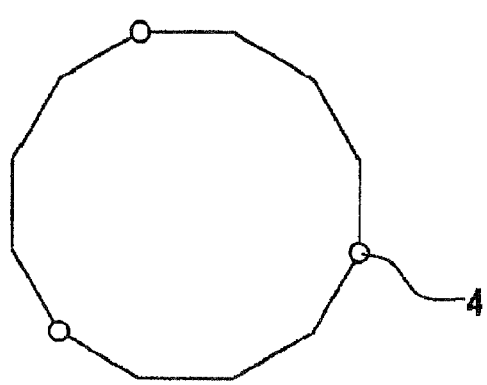
Figure 4:
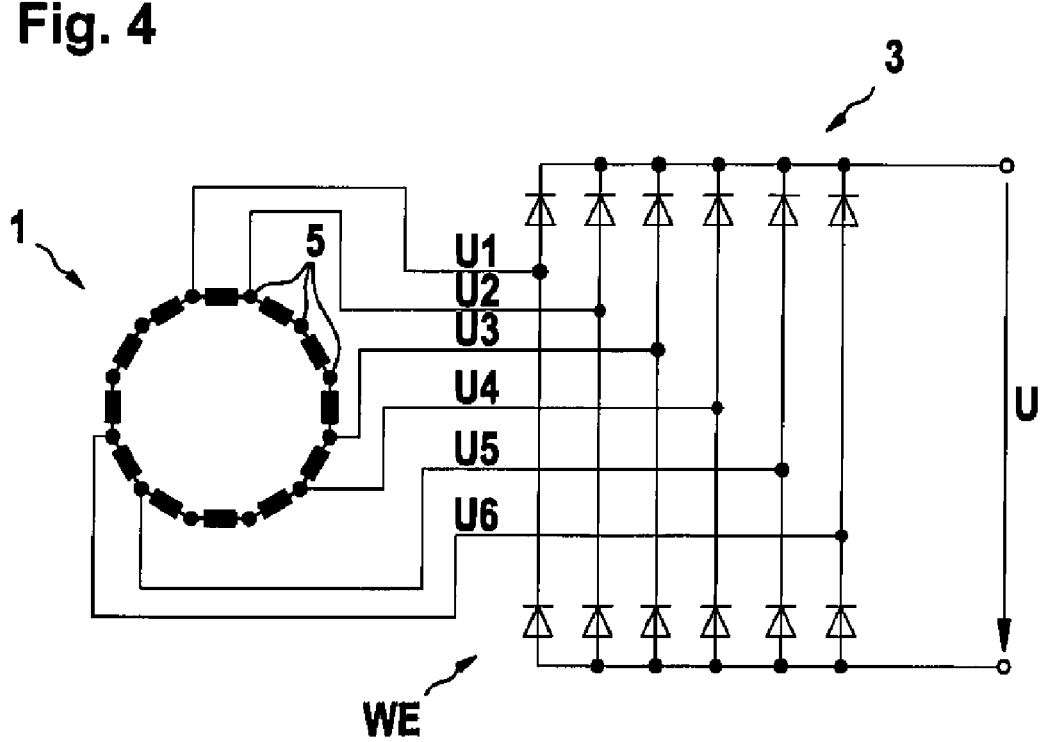
Figure 5:
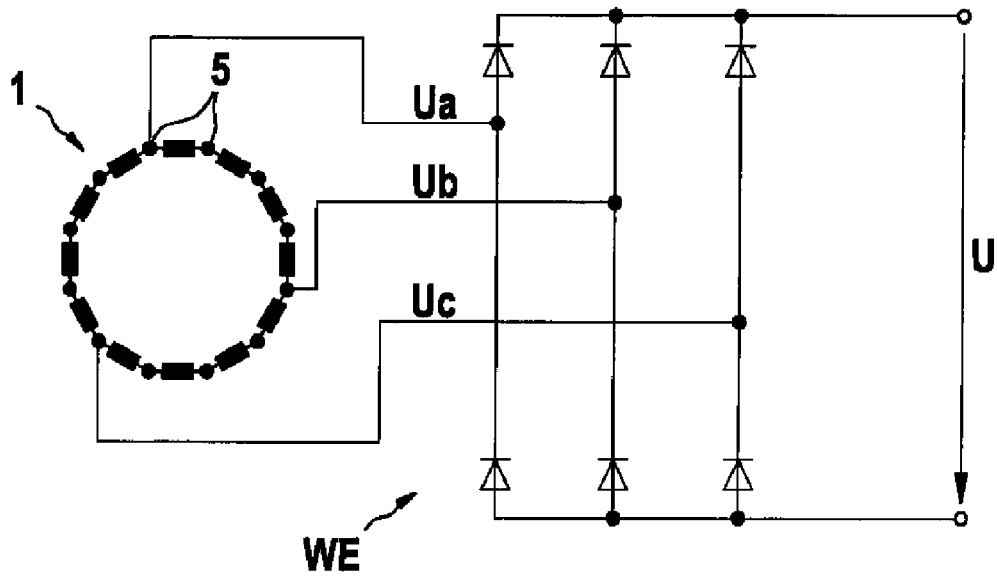
Figure 6:
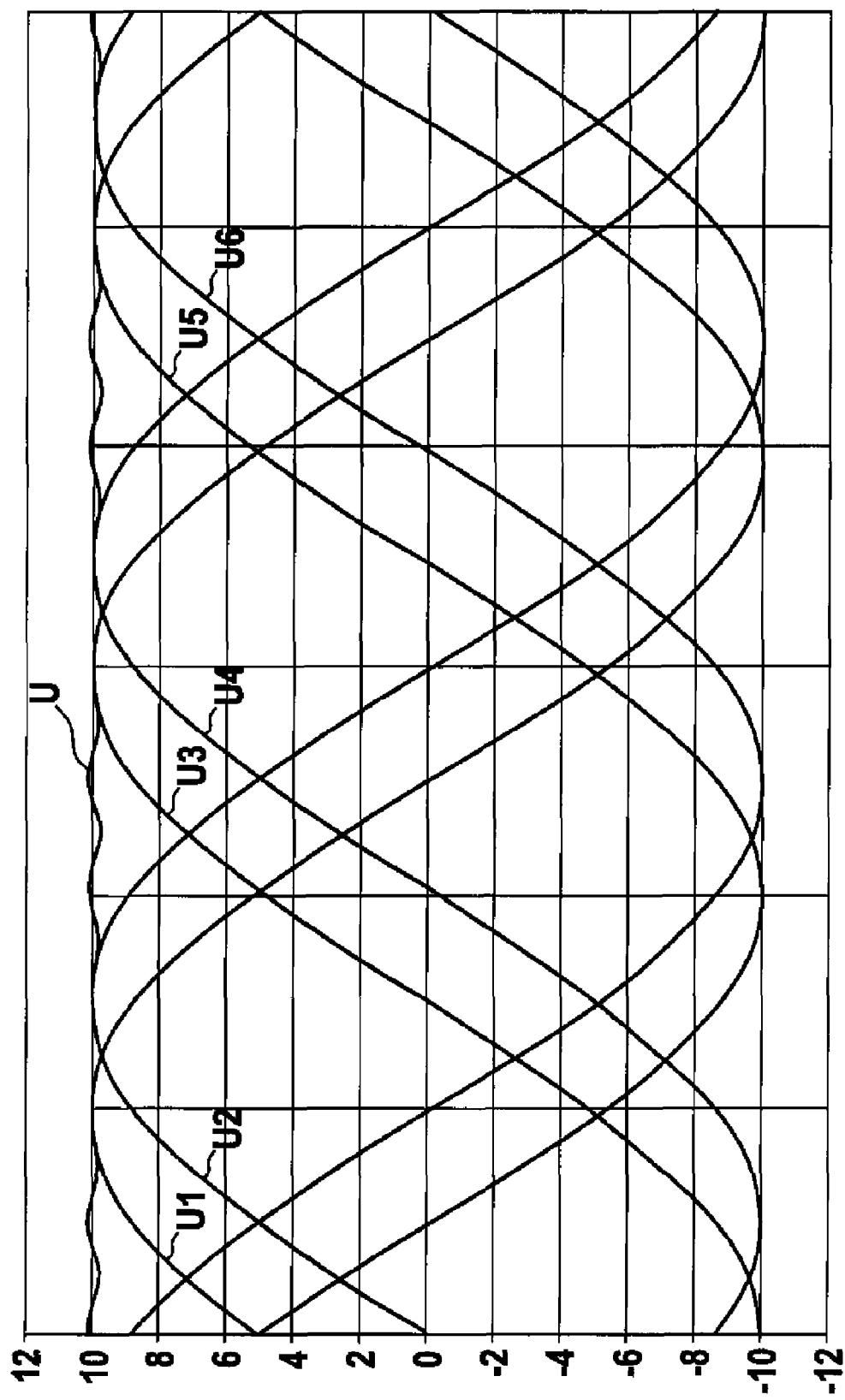
Figure 7:
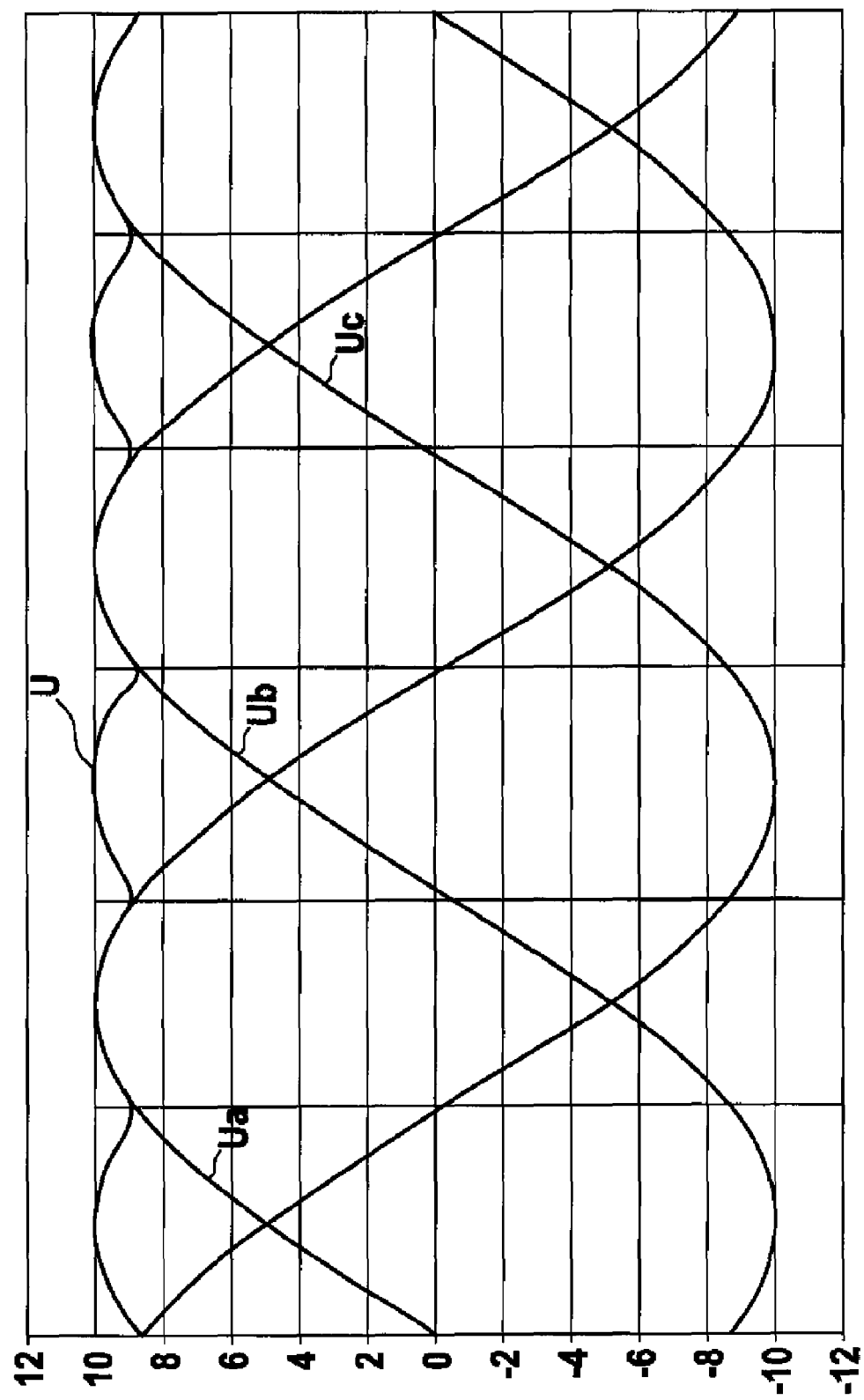

FIG. 1 is a longitudinal section through an alternating current generator for motor vehicles, equipped with a claw pole rotor, FIG. 2 is a depiction of a 12-vertex ring connection of a stator of a generator according to the invention, which is embodied in a 6-phase form, FIG. 3 is a depiction of a 12-vertex ring connection of a stator of a generator according to the invention, which is embodied in a 3-phase form, FIG. 4 shows the 12-vertex ring connection according to FIG. 2, equipped with a bridge circuit for 6 phase windings and with 12 rectifier diodes, FIG. 5 shows the 12-vertex ring connection according to FIG. 3, equipped with a bridge circuit for 3 phase windings and with 6 rectifier diodes, FIG. 6 is a voltage graph for the connection in FIG. 4, and FIG. 7 is a voltage graph for the connection in FIG. 5.

Figure 8:
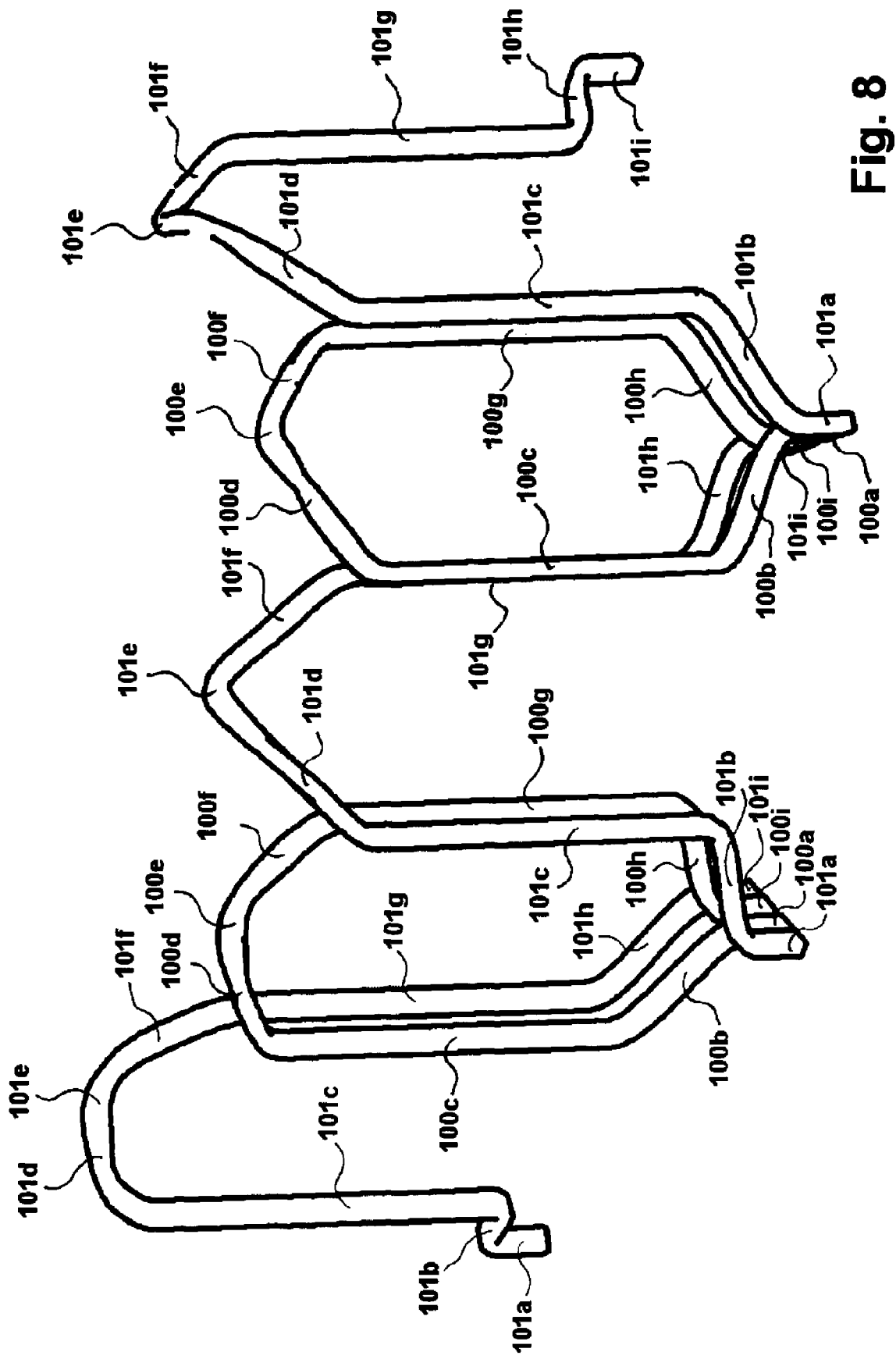

FIG. 8 is a view of a detail of a partial phase winding.

FIG. 1 is a section through an electric machine embodied in the form of an alternating current generator 30 for motor vehicles. Among other things, it has a two-part housing 33 that is composed of a first end plate 33.1 and a second end plate 33.2. The end plate 33.1 and the end plate 33.2 embrace a stator 36 equipped with a circular ring-shaped laminated core 38 whose axially extending slots 35, which are open toward the inside, have a stator winding 31 inserted into them. The radially inward-facing surface of the annular stator 36 encompasses an electromagnetically excited rotor 32 that is embodied in the form of a claw pole rotor. Among other things, the rotor 32 is composed of two claw pole plates 42 and 43, which have respective axially extending claw pole fingers 44 and 45 situated at their outer circumference surfaces. Both of the claw pole plates 42 and 43 are situated in the rotor 32 so that their claw pole fingers 44, 45 extending in the axial direction alternate with one another as North and South poles on the circumference of the rotor 32. This produces magnetically required claw pole gaps, which are situated between the oppositely magnetized claw pole fingers 44 and 45 and which, due to the fact that the claw pole fingers 44 and 45 taper toward their free ends, extend at a slight inclination in relation to the machine axis. In the description of the invention given below, the course of them is referred to as axial for the sake of simplicity. The rotor 32 is supported in rotary fashion by means of a shaft 47 and respective roller bearings 48, which are provided on each side in the respective end plates 33.1 and 33.2. It has two axial end surfaces, each of which has a respective fan 50 attached to it. These fans 50 are essentially composed of a plate-shaped or disk-shaped section from which the fan blades extend in a known fashion. These fans 50 are used to enable an exchange of air between the exterior and the interior of the electric machine 30 via openings 60 in the end plates 33.1 and 33.2. To that end, the openings 60 are provided at the axial ends of the end plates 33.1 and 33.2, via which the fans 50 draw cool air into the interior of the electric machine 30. This cool air is accelerated radially outward by the rotation of the fans 50 so that it can pass through cooling-air-permeable winding heads on the drive side 65 and on the electronics side 66 (the side with the slip ring, brush, or rectifier). This effect cools the winding heads. After passing through the winding heads and circulating around them, the cooling air takes a path in the radially outward direction, passing through openings, not shown, between the partition walls shown. On the right side in FIG. 1, there is a protective cap 67, which protects various components from environmental influences. For example, this protective cap 67 covers a slip ring assembly 69 that supplies an excitation winding 34 with excitation current. Around this slip ring assembly 69 is a cooling element 73, which in this instance, functions as a plus cooling element. The end plate 33.2 functions as a so-called minus cooling element. Between the end plate 33.2 and the cooling element 73, there is a connecting plate 76 that connects minus diodes 78, which are attached in the end plate 32, and plus diodes, not shown in the drawing, of a rectifier 39 in the cooling element 73 to one another in the form of a bridge circuit.

The winding heads 65, 66 can each be cooled by a respective virtually radial flow of cooling air, which is produced by fans 50 mounted to at least one axial end of a claw pole plate 42, 43.

FIG. 2 shows a 12-vertex ring connection 1 of a stator 36 of a generator 30 according to the invention. The stator 36 is provided in a known fashion with winding slots 35 that are not shown. Phase windings 10-21 are situated in the winding slots 35. The partial phase windings 10-21 are embodied in the form of half phase windings, i.e. there are two respective partial phase windings 10, 16; 11, 17; 12, 18; 13, 19; 14, 20; 15, 21, which are inserted with nearly identical electrical phase positions into the same slots 35. In order to manufacture this configuration, a stator 36 is advantageously used, which has a number of slots 35 that corresponds to six times the number of magnetic poles.

The generator 30 serves to supply the electrical system and/or to supply the battery of a motor vehicle and in the exemplary embodiment according to FIG. 2, is embodied in the form of a 6-phase generator. The ring connection 1 includes twelve partial phase windings 10-21. The partial phase windings 10-21 are connected in series, with the first end 22 of the first partial phase winding 10 being electrically connected to the second end 23 of the last partial phase winding 21. The electric angle of the partial phase windings 10-21 to one another is 30° electrically or a multiple of 30° electrically. The electric angle between two successive partial phase windings 10-21 of the ring connection 1 is approx. 30°.

The first ends 22 and the second ends 23 of the partial phase windings 10-21 are axially connected directly to a winding head 65, 66 of the generator or are radially connected next to it.

FIG. 4 shows an associated connection with a three-phase current bridge circuit 3, in fact a 6-phase connection and a connection with six alternating current inputs WE. The connection according to FIG. 2 has six pick-ups 4 that are connected to the bridge circuit according to FIG. 4. The six pick-ups 4 are not all distributed uniformly around the ring, as shown in FIG. 2. The pick-ups 4 are situated at the ends of the winding sections 10, 14, and 18. The phase windings 2 are connected to a bridge circuit 3 (FIG. 4). The multiphase AC voltage, which is produced by the rotating field generated by the moving rotor, is converted into a DC voltage U by the bridge or rectifier circuit. The DC voltage U is compatible with the electrical system voltage.

The invention thus provides an electric machine, in particular an alternating current generator for a motor vehicle, having a rotor 32 and claw pole fingers 44, 45 that extend in the axial direction, with the claw pole fingers 44, 45 alternating as North poles and South poles along the circumference of the rotor 32, and having a stator 36 that has a stator core 38 equipped with a stator winding 31 situated in slots 35 of the stator core 38; the stator 36 is situated opposite the rotor 32 and the stator 36 and rotor 32 are supported by two end plates 33, with an annular coil-shaped excitation coil 34 that is mounted on the rotor 32; the stator winding 31 has twelve partial phase windings 10-21; at least two partial phase windings 10-21 have the same electrical phase position and are situated in the same slots 35 of the stator 36; the partial phase windings 10-21 are connected to one another in series, with a phase angle of 30° electrically, consequently forming a 12-vertex ring connection 1; and the number of alternating current inputs (WE) of the bridge circuit 3 of the rectifier 39 is smaller than the number of partial phase windings 10-21.

In a very particular fashion, the invention provides an electric machine in which the number of vertices 12 and the number of alternating current inputs (WE) of the bridge circuit 3 of the rectifier is three.

According to another embodiment of the invention, the number of vertices 12 and the number of alternating current inputs (WE) of the bridge circuit 3 of the rectifier is three.

FIG. 6 shows a voltage graph (in volts) of the circuit arrangement shown in FIG. 4. Voltages U1-U6 are induced at the pick-ups 4. The voltages U1 and U2 are phase-shifted by 30°, as are the voltages U3, U4 and U5, U6. The voltages U1, U3 are phase shifted by 120°, as are the voltages U3, U5 and U5, U1. The voltage U represents the bridge voltage and a pulsating DC current. The ripple, however, is slight, which results in a favorable noise behavior and efficiency level.

FIG. 3 is a depiction of a 12-vertex ring connection 1 of a stator in a variation of the generator according to the invention. FIG. 5 shows an associated connection with a three-phase current bridge circuit, in fact a 3-phase connection and a circuit with three alternating current inputs WE.

The circuit according to FIG. 3 has only three pick-ups 4 that are connected to the bridge circuit according to FIG. 5. All six of the pick-ups 4 are uniformly distributed. Because of the higher number of diodes, the circuit according to FIG. 4 has a lower voltage ripple than the one in FIG. 5.

Preferably, each phase of the generator (FIGS. 1 and 2) is composed of individual conductor segments; in particular, the conductor segments are U-shaped.

FIG. 7 shows a voltage graph of the circuit in FIG. 5, with the bridge voltage U and the voltages at the pick-ups 4, namely Ua, Ub, and Uc. The voltages Ua, Ub, and Uc are phase-shifted by 120°.

FIGS. 4 and 5 also show the connecting points 5 of the output wires of the phase windings. In particular, these are directly connected to a stator winding head.

As an implementation example, FIG. 8 shows a section of a segmented partial phase winding, which is composed of four conductor segments connected to one another. The winding shown is depicted with four conductors in each slot; the narrow sides of the conductors face one another and the wide sides of the conductors face the slot wall. The conductors are situated in the slot in four radial slot positions; the outermost slot position is labeled slot position 1 and the innermost slot position is labeled 4.

Each conductor segment 100, 101 is composed of at least one essentially axially oriented first connecting section 100a, 101a, which serves to contact two radially adjacent connecting sections 100a, 101a, 100i, 101i. This contact can be produced, for example, by means of welding, soldering, or another method for producing an electrical contact. The first connecting section 100a, 101a transitions into a first inclined section 100b, 101b, which connects the first connecting section 100a, 101a to a first axially oriented section 100c, 101c of the conductor segment 10, 101 situated in a slot 35. The first section 100c, 101c situated in the slot 35 transitions into a second inclined section 100d, 101d, which transitions into a bend section 100e, 101e. A third inclined section 100f, 101f leads from the bend section and connects the bend section 100e, 101e to a second section 100g, 101g situated in the slot 35. The second section 100g, 101g situated in the slot 35 is connected to a fourth inclined section 100h, 101h, which feeds into a second essentially axially oriented connecting section 100i, 101i. In principle, it is also conceivable here for the conductor segment to be composed of a plurality of windings, i.e. for there to be a plurality of bend sections 100e, 100e situated on both axial sides of the stator core. A conductor segment is usually divided into two radial layers, with the first connecting section 100a, 101a, the first inclined section 100b, 101b, the first straight section 100c, 101c in the slot, and the second inclined section 100d, 101d situated in the same radial layer. The third inclined section 100f, 101f, the second section 100g, 101g in the slot, the fourth inclined section 100h, 100h, and the second connecting section are situated in a second radial layer. The bend section connects the sections of the two radial planes.

The winding of a stator phase described here by way of example is composed of two different conductor segments. an inner conductor segment 100 that is situated in the slot positions 2 and 3, an outer conductor segment 101 that encloses the inner conductor segment 100 on the winding head 66 on the electronics side and that is situated in the slot positions 1 and 4

The section of a partial phase winding shown in FIG. 8 is connected as follows. The first outer conductor segment 101 is situated with a first straight section 101c in slot position 1 and with its second straight section in slot position 4, and is connected with its second connecting section 1011 to the second connecting section 100i of a first inner conductor segment 100. The second connecting section of the first inner conductor segment is connected to a second straight section 100g situated in the slot position 3, to a first section 100c situated in the slot in slot position 2 of the inner conductor segment, and to a first connecting section of the inner conductor segment 100a. The first connecting section of the first inner conductor segment 100a is connected to the second outer conductor segment via the first bend section 101a, which is connected in turn to a first straight section 101c situated in slot in slot position 1, a second straight section 101g in slot position 4, and a second connecting section 101i.

The second connecting section of the second outer conductor segment 101g is connected to the second inner conductor segment via the second connecting section 100i, which is connected in turn to a second straight section 101g situated in a slot in slot position 3, a first straight section 100c in slot position 2, and a first connecting section 100a.

The remaining sections of the partial phase winding are produced by continuing the scheme given above until the partial phase winding describes a complete circle inside the slots of the stator. The second partial phase winding with the virtually identical electrical phase position is produced by transferring this scheme to slots that are offset by one pole division.

The sequence of the inner and outer conductor segments produces a lap winding. The embodiment of the conductor segment winding is not, however, limited to this example. It is likewise possible to construct a conductor segment winding with two identical conductor segments situated next to one another in the radial direction, which then connect the slot positions 1 and 2 and, respectively, 3 and 4 and then correspondingly constitute a wave winding.

The depicted section of a stator winding 31 for a stator 36 with 96 slots 15, 12 partial phase windings, and an electrically excited rotor 32 with 16 polls. The windings of the outer partial phase windings are embodied in accordance with FIG. 8. They are not limited to this embodiment; it is likewise possible to manufacture a comparable winding for a stator with 72 slots 15, 12 partial phase windings, and 3 or 6 phases and for an electrically excited rotor 20 with 12 poles.

The manufacture of conductor segments starts with a round or profile wire, which is first brought into a U-shaped or V-shaped preform or preliminary stage. This preform already has the radial distances of the two sections in the slots, but these sections are not spaced apart in the circumference direction. This spacing is manufactured by turning the preliminary stage of the conductor segment in the circumference direction, slot position by slot position. The resulting second preliminary stage of the conductor segment is slid axially into a round laminated stator core. In order to complete the winding, the connecting sections slot positions are bent toward each other and then attached to one another so that an electrical contact is produced between the respective connecting sections.

Each partial phase winding is composed of two different conductor segments, each slot 35 has four slot positions, and the four sections of the conductor segments situated in one slot face on another with the short sides of their cross sections.

The ends of the partial phase windings preferably extend out from the slots, which are distributed over 80% of the stator circumference. The ends of the first partial phase windings 10, 16 preferably extend out from the slots one and seven, the ends of the second partial phase windings 11, 17 preferably extend out from the slots fifty and fifty-six, the ends of the third partial phase windings 12, 18 preferably extend out from the slots nine and fifteen, the ends of the fourth partial phase windings 13, 19 preferably extend out from the slots fifty-eight and sixty-four, the ends of the fifth partial phase windings 14, 20 preferably extend out from the slots twenty-nine and thirty-five, and the ends of the sixth partial phase windings 12, 18 preferably extend out from the slots thirty and thirty-six. The first ends 22 and second ends 23 of the partial phase windings 10-21 are spaced irregular distances apart in the circumference direction and are therefore limited to a section that is less than 80% of the stator circumference.

Essentially, the individual phase windings can be composed of a single wound stator winding made of a continuous wire.

The 6-phase design (FIG. 4) has the advantage of a low magnetic noise and a low voltage ripple of the DC voltage. The 3-phase design (FIG. 5), however, has the advantage of lower costs due to the savings of six diodes achieved in comparison to the design according to FIG. 4.

The number of conductors that are situated in a slot is indicated by the letter z. The conductor number z of the generator according to the invention preferably lies in the range 2=z=10, in particular 4, in order to produce an embodiment for a voltage of 14 volts (vehicle electrical system).

What is claimed is:

1. An alternating current generator for a motor vehicle, having a rotor (32) and claw pole fingers (44, 45) that extend in the axial direction, which alternate with one another as North and South poles on the circumference of the rotor (32), and having a stator (36) that has a stator core (38) equipped with a stator winding (31) situated in slots (35) of the stator core (38),
    wherein the stator (36) is situated opposite the rotor (32);
    the stator (36) and the rotor (32) are supported by two end plates (33), with an annular coil-shaped excitation coil (34) that is mounted on the rotor (32);
    wherein the stator winding (31) has twelve partial phase windings (10-21);
    wherein at least two of the partial phase windings (10-21) have the same electrical phase position and are situated in the same slots (35) of the stator (36);
    wherein the partial phase windings (10-21) are connected to one another in series, with a phase angle of 30° electrically, consequently forming a 12-vertex ring connection (1); and
    wherein a number of alternating current inputs (WE) of a bridge circuit (3) of a rectifier (39) that is connected to the stator winding (31) is smaller than the number of partial phase windings (10-21).

2. The alternating current generator for a motor vehicle as recited in claim 1, wherein the stator winding (31) has winding heads (65, 66) that are each coolable by a respective virtually radial flow of cooling air, which is produced by fans (50) mounted on at least one axial end of a claw pole plate (42, 43).

3. The alternating current generator for a motor vehicle as recited in claim 1, wherein the number of slots (35) corresponds to six times the number of poles of the rotor (32).

4. The alternating current generator for a motor vehicle as recited in claim 1, wherein the first ends (22) and the second ends (23) of the partial phase windings (10-21) are axially connected directly to a winding head (65, 66) of the generator or are radially connected next to it.

5. The alternating current generator for a motor vehicle as recited in claim 1, wherein the nominal voltage of the generator corresponds to the electrical system voltage of a motor vehicle, approximately 14 volts.

6. The alternating current generator for a motor vehicle as recited in claim 1, characterized by means of a stator slot space factor of >50%.

7. The alternating current generator for a motor vehicle as recited in claim 1, wherein the number of vertices is 12 and the number of alternating current inputs (WE) of the bridge circuit (3) of the rectifier is three.

8. The alternating current generator for a motor vehicle as recited in claim 1, wherein the number of vertices is 12 and the number of alternating current inputs (WE) of the bridge circuit of the rectifier (3) is six.

9. The alternating current generator for a motor vehicle as recited in claim 1, wherein the number of conductors z is between 2 and 10.

10. The alternating current generator for a motor vehicle as recited in claim 1, wherein each partial phase winding is composed of individual conductor segments.

11. The alternating current generator for a motor vehicle as recited in claim 1, wherein first ends (22) and second ends (23) of the partial phase windings (10-21) are spaced irregular distances apart in the circumference direction and are therefore limited to a section that is less than 80% of the stator circumference.

12. The alternating current generator for a motor vehicle as recited in claim 1, wherein the number of conductors z is 4.

* * * * *